United States Patent [19]
Shea

[11] 3,842,691
[45] Oct. 22, 1974

[54] PLANETARY TRANSMISSION
[75] Inventor: Dennis W. Shea, Toledo, Ohio
[73] Assignee: Dana Corporation, Toledo, Ohio
[22] Filed: May 9, 1973
[21] Appl. No.: 358,755

[52] U.S. Cl.............. 74/768, 74/750 B, 192/6 A
[51] Int. Cl. .... F16h 57/10, F16h 3/44, F16d 41/24
[58] Field of Search............ 74/768, 750 B; 192/6 A

[56] References Cited
UNITED STATES PATENTS

| | | | |
|---|---|---|---|
| 2,494,558 | 1/1950 | Irwin | 74/750 B |
| 3,726,156 | 4/1973 | Tijen et al. | 74/750 B |
| 3,727,484 | 4/1973 | Shea et al. | 74/768 |
| 3,766,805 | 10/1973 | Shea et al. | 74/768 |

FOREIGN PATENTS OR APPLICATIONS

| | | | |
|---|---|---|---|
| 350,114 | 6/1931 | Great Britain | 74/768 |

*Primary Examiner*—Samuel Scott
*Assistant Examiner*—P. S. Lall
*Attorney, Agent, or Firm*—Robert E. Pollock

[57] ABSTRACT

The disclosure is directed to a planetary type transmission particularly adapted to a velocipede. Planetary gearing is connected to an input shaft and sun gears are carried by an output shaft which, for example, mounts the drive sprocket of a velocipede. Ring gears are selectively engaged by shifing pawls to maintain a desired one of the ring gears stationary to provide the desired speed ratio between the input and output shafts. Cam mechanism is responsive to reverse rotation of the input shaft to positively disengage the shifting pawls and to engage a predetermined ring gear and to hold it stationary during, for example, the braking action of a velocipede.

25 Claims, 10 Drawing Figures

PLANETARY TRANSMISSION

SUMMARY OF THE INVENTION

This invention relates to planetary transmissions generally and more particularly to a transmission which may be used on a velocipede, for example, a bicycle. The present invention is an improvement of the transmission shown and described in the copending U.S. patent application Ser. No. 220,283, filed Jan. 24, 1972, in which I am a joint inventor. The present transmission is suitable for use in a larger number of installations; an ideal application being in a two-wheel bicycle or a three-wheel tricycle having a conventional coaster-brake type of driving wheel.

Bicycles having a plural ratio drive arrangement have become widely accepted and used throughout the world. The most common of these includes a multi-speed drive arrangement in the hub of the driving wheel or between the pedal sprocket and the driving wheel sprocket. However, with such driving arrangements, separate hand-operated brakes are utilized because the space within the driving wheel hub is utilized for the multi-speed drive arrangement and there often isn't sufficient space to accommodate braking means of adequate size.

The transmission of the present invention is mounted by the frame or adjacent the frame in the location of the conventional bicycle pedal crank hub and, therefore, can be utilized to drive the sprocket carried by the driving wheel. The space within the wheel hub can then be used to accommodate a conventional coaster-brake assembly.

In a coaster-brake wheel hub, rotating the wheel sprocket in the drive direction imparts a forward drive rotation to the wheel. When the sprocket is held stationary, i.e. when the pedals are not actuated, the driving wheel can overrun the wheel sprocket and when the sprocket is rotated in the reverse direction, braking means associated with the driving wheel hub are energized to brake the wheel rotation and thereby stop movement of the bicycle.

The transmission, according to the present invention, when used with the coaster-brake equipped driving wheel provides a plural ratio drive and also allows for pedal actuated braking. Because the coaster-brake hub provides for driving wheel overrunning, there is usually no necessity for a "neutral" condition in the driving transmission of this invention. However, a neutral condition may be provided in transmissions according to the present invention.

The multiple speed transmission of this invention has separate planetary gear sets for an underdrive ratio, a normal or conventional ratio and an overdrive ratio. The normal or conventional ratio provides an overall drive ratio between the pedals and the rear wheels of a bicycle which is equivalent to the ratio normally encountered in a single speed bicycle. The present transmission can also be utilized with additional gear sets or with, for example, two planetary gear sets. For example, a normal drive ratio and an overdrive ratio may be provided or, alternatively, one that has five planetary gear sets.

The present transmission includes an input shaft and an output drive member, with the input shaft being adapted for rotation in both a forward and a reverse direction. The planetary gear sets include a sun gear which is drivingly connected to the output member, planetary gearing which is drivingly connected to the input shaft and a ring gear. Transmission shifting mechanism or control means includes a plurality of pawls engageable with the ring gear of the various gear sets to maintain the selected ring gear stationary, thereby engaging the selected gear ratio.

An important feature of the present invention is cam means which are responsive to the reverse rotation of the input shaft. The cam means includes a reverse pawl which, whenever the input shaft of the transmission is rotated in a reverse direction, engages a predetermined ring gear, for example the underdrive ring gear, and prevents rotation thereof. This insures that such reverse rotation of the output shaft is provided with a gear ratio which gives a good mechanical advantage with respect to the input shaft thereby insuring maximum braking effort. The cam means also includes an element which biases the selectable pawls out of engagement with their respective ring gear upon reverse rotation of the input shaft.

It is, therefore, an object of the present invention to provide a transmission which includes positive means for disengaging the normal forward shiftable pawls and for holding stationary a predetermined ring gear during the braking operation of, for example, a bicycle.

Another object of this invention is to provide a planetary multiple ratio transmission which insures that a driving connection will always exist between the input and output shafts when the input shaft is rotated in a reverse direction.

Still another object of the invention is to provide a multi-speed ratio transmission which can be used to drive a bicycle and can be utilized with a driving wheel having a coaster-brake hub so that a selected one of several forward ratios can be obtained and pedal braking automatically provides a maximum braking gear ratio.

DESCRIPTION OF THE PREFERRED EMBODIMENT

Figure 1:
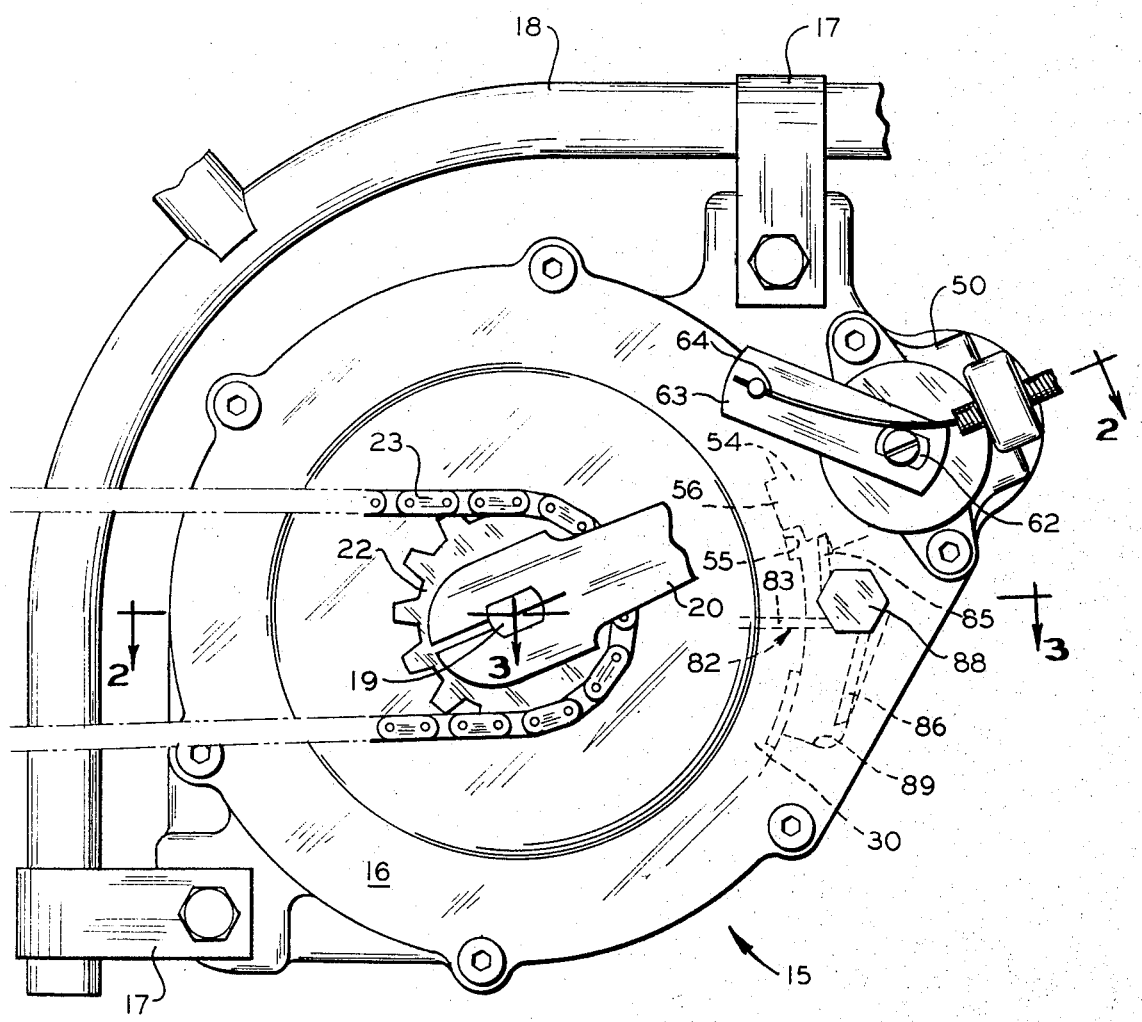
FIG. 1 is a side elevational view of a portion of a bicycle frame having a transmission, according to the present invention, mounted thereof.

A transmission, according to the present invention, is generally indicated by the reference number 15 in FIG. 1. The transmission 15 includes a housing 16 which is mounted by brackets 17 to, for example, a bicycle frame 18. In other embodiments of the present invention, not shown, the transmission may be included or received by a central hub portion of a bicycle or other type of velocipede rather than being mounted by the brackets 17.

Figure 2:
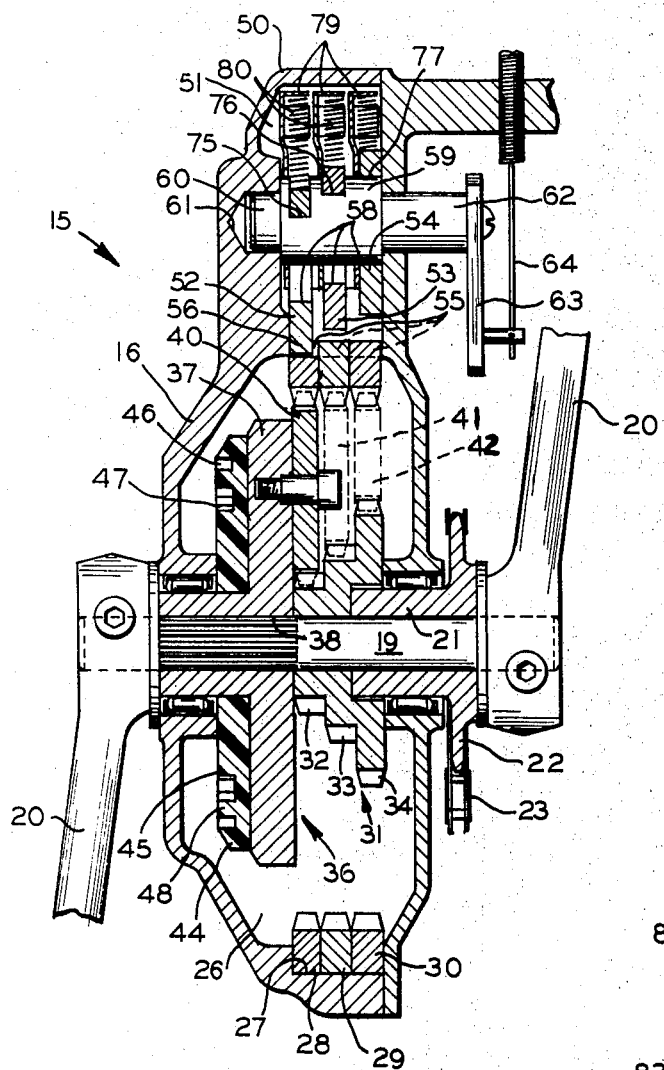
FIG. 2 is a cross-sectional view taken along the line 2—2 of FIG. 1, with two of the planetary gear sets indicated by dashed lines and shown out of their normal positions for clarity.

Referring to FIG. 2, the housing 16 receives an input shaft 19 which protrudes from the housing 16 and mounts a pair of pedal cranks 20. An output shaft or driven hub 21 is rotatably journaled on the input shaft 19. The driven hub 21 includes a drive sprocket 22 which is connected by a chain 23 to the drive wheel (not shown) of the bicycle. The drive wheel of the bicycle normally includes a coaster-brake which is actuated upon reverse movement of the chain 23.

The housing 16 defines a cavity 26 which receives a plurality of planetary gear sets. More particularly, the peripheral wall of the cavity 26 defines an annular slot 27 which receives three ring gears 28, 29 and 30. A cluster gear 31 which includes three sun gears 32, 33 and 34, is rotatably mounted with respect to the input shaft and is splined to the output shaft 21. Planetary gearing, generally indicated by the reference number 36, includes a carrier 37 which is generally disk-shaped and has a splined central bore 38. The input shaft 19 receives the splined bore 38 of the carrier 37.

Figure 4:
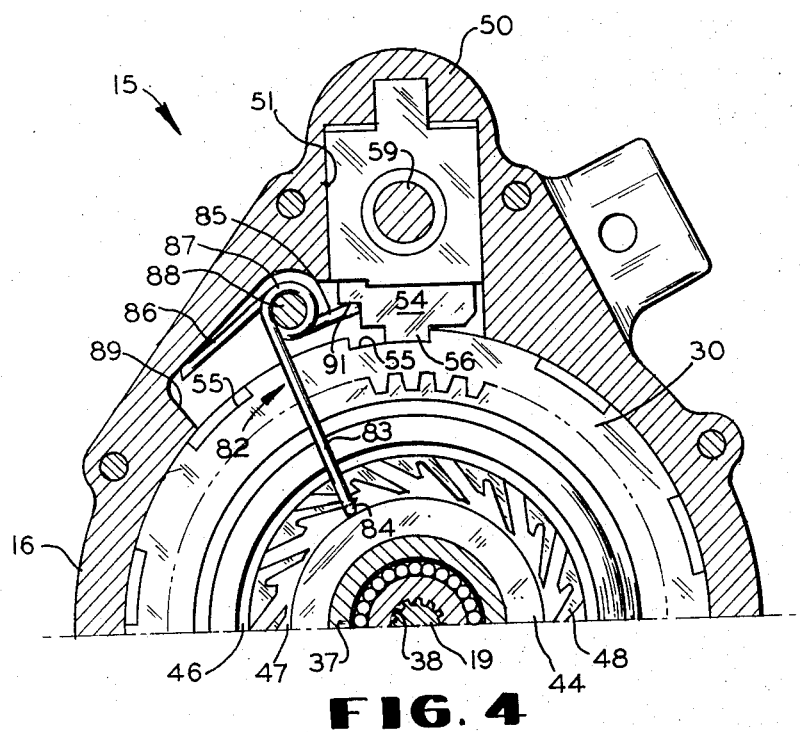
FIG. 4 is a fragmentary, cross-sectional view, taken along the line 4—4 of FIG. 3 with a part of the housing removed for clarity, and showing the transmission during forward rotation of the input shaft, with some of the gears of the transmission omitted for added clarity.
Figure 5:
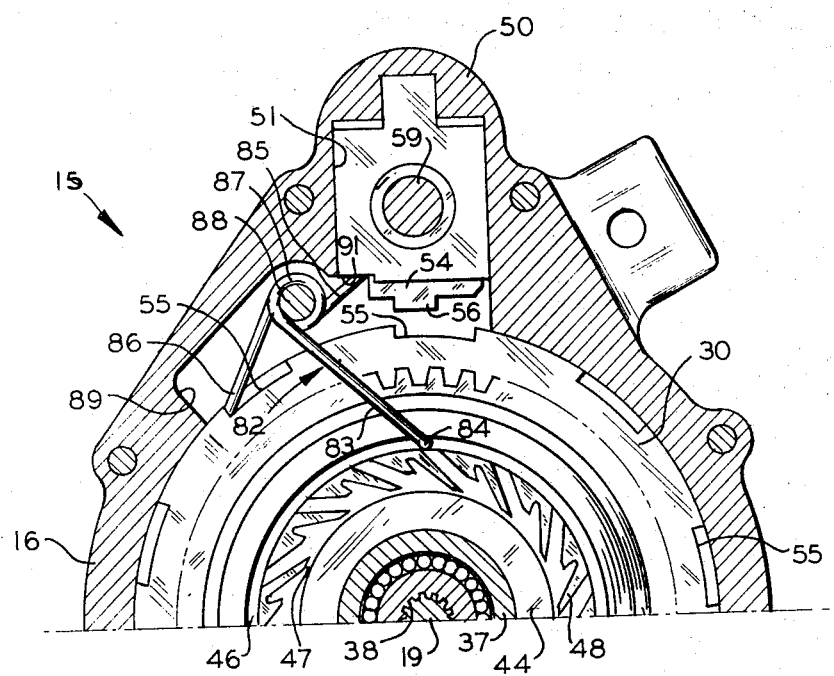
FIG. 5 is a fragmentary, cross-sectional view, similar to FIG. 4, and showing the transmission during reverse rotation of the input shaft.
Figure 6:
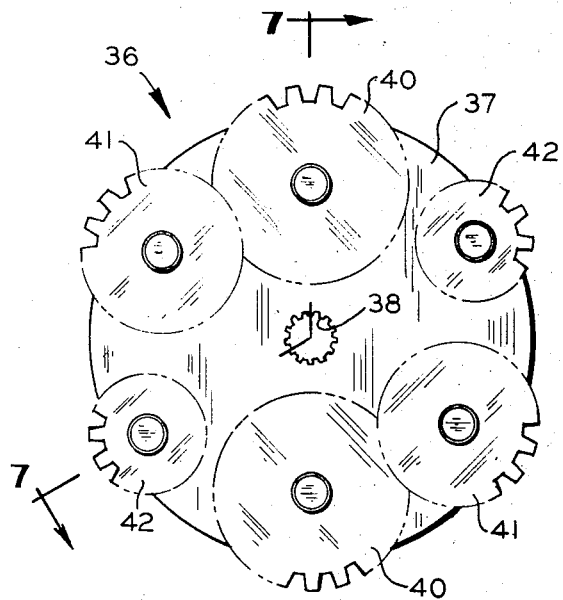
FIG. 6 is a side elevational view of the planet gears and the planet carrier assembly as viewed from the right in FIG. 2.
Figure 7:
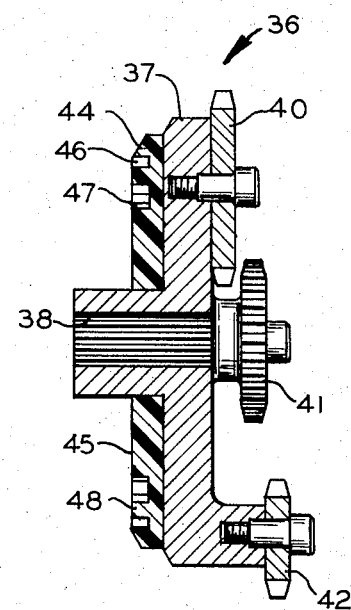
FIG. 7 is a sectional view of the planet gears and the planet carrier assembly taken along the line 7—7 of FIG. 6.

Referring to FIGS. 6 and 7, the carrier 37 rotatably mounts opposed pairs of planet gears 40, 41 and 42 adjacent its periphery. The planet gears 40 are drivingly disposed and meshed with the ring gear 28 and the sun gear 32; the planet gears 41 are drivingly disposed and meshed with the ring gear 29 and the sun gear 33; and the planet gears 42 are drivingly disposed and meshed with the ring gear 30 and the sun gear 34. A generally circular cam plate 44 is mounted on the carrier 37 in opposed relation to the planet gears 40, 41 and 42. The circular cam plate 44 is driven by the input shaft 19. Referring to FIGS. 4 and 5, the cam plate 44 defines on its side 45 an outer cam path 46 and a concentric inner cam path 47. The present cam plate 44 is constructed of a plastic material and a plurality of inclined guide members or fingers 48 extend downwardly in an inclined relationship between the outer cam path 46 and the inner cam path 47. The guide fingers 48 are connected adjacent the outer cam path 46 and become dimensionally smaller as they approach the inner cam path 47. The portion of the guide fingers 48 adjacent the inner cam path 47 are resilient.

A particular combination of gear teeth in the various gear ratios and the increased speed ratio obtained thereby is set forth in the above-mentioned copending patent application Ser. No. 220,283, which is incorporated herein by reference. Suffice it to say that the first power path or gear train which includes the ring gear 30, the sun gear 34 and the planet gears 42 provides the low or first gear ratio. This low gear ratio could be termed an "underdrive" ratio as compared to the normal ratio of a single speed bicycle. The second power path or gear train consisting of the ring gear 29, the sun gear 33 and the planet gears 41, provides an intermediate or second gear ratio which corresponds with the "normal" ratio of a single speed bicycle. The remaining ring gear 28, the sun gear 32 and the planet gears 40 provide a third or high gear ratio, which corresponds to an "overdrive" ratio when compared to the normal ratio of a single speed bicycle. Ratios other than those described above may, of course, be provided.

Control means, including shiftable means, is provided for selecting the desired one of the ring gears 28, 29, 30 and preventing the same from rotating relative to the housing 16. Referring to FIGS. 2–5 and 8, the housing 16 has a projecting portion 50 having a radially extending bore 51 therein which opens into the annular slot 27 and receives three shifter pawls 52, 53 and 54. The pawls 52, 53, 54 are movable radially within the bore 51 and are aligned respectively with the ring gears 28, 29 and 30. All of the pawls 52, 53, 54 are of identical shape and have an axial width slightly less than the width of the individual ring gears 28, 29 and 30. Referring to FIG. 4, wherein the ring gears 28 and 29 have been omitted for clarity, the ring gear 30 has a plurality of circumferentially spaced detent openings 55 defined in its periphery. Ring gears 28 and 29 have like detent openings 55 in their peripheries. Each of the shifter pawls 52, 53, 54 includes a lug 56 which is movable into and out of engagement with one of the detent openings 55 of its associated ring gear 28, 29, 30. When the shifter pawls 52, 53, 54 are radially outwardly in a disengaged position (see FIG. 5), the respective ring gear 28, 29, 30 is free to rotate relative to the housing 16 unless it is held by the cam means, as will be discussed below. When one of the shifter pawls 52, 53, 54 is moved downwardly, as shown in FIG. 4, wherein its lug 56 is received by one of the detent openings 55 in a respective ring gear 28, 29, 30, the ring gear is arrested or held stationary relative to the housing 16.

Figure 8:
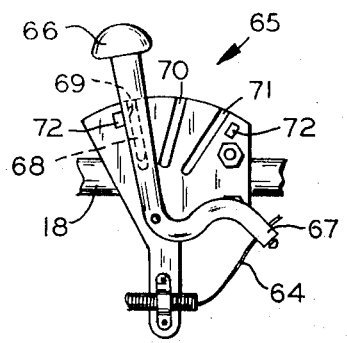
FIG. 8 is a schematic view of a hand operable shift lever.

Each of the shifter pawls 52, 53, 54 includes an opening 58 which is elongated in the radial direction and is rounded at the radially inner end. An axially extending shifter shaft 59 is disposed parallel to the input shaft 19 and is received by the aligned shifter pawl openings 58. An end 60 of the shaft 59 is rotatably received in a blind bore 61 of the housing projecting portion 50. The other end 62 mounts a lever arm 63. A cable 64 is connected to the distal end of the lever arm 63. Referring to FIG. 8, a gear shift control 65 is, for example, mounted on the frame 18 of the bicycle and includes a pivotally mounted shift handle 66 having its lowermost end 67 connected to the cable 64. A detent 68 is formed on the upper portion of the shift handle 66 and cooperates with three spaced indentations 69, 70 and 71 which are defined by the gear shift control 65. Stops 72 are provided on the gear shift control 65 to limit the travel of the shift handle 66.

When the shift handle 66 is positioned adjacent the indentation 69, the transmission 15 is in the underdrive ratio position shown in FIG. 2; when the handle 66 is adjacent the indentation 70, the transmission 15 is in the normal ratio; and when the handle 66 is adjacent the indentation 71, the transmission 15 is in the overdrive ratio.

The shifter shaft 59 defines three axially spaced and chordally extending slots 75, 76 and 77 each of which is in alignment with one of the respective shifter pawls 52, 53 and 54. The slots 75, 76, 77 are disposed angularly with respect to one another. Therefore, only one of the shifter pawls 52, 53, 54 is engaged with its respective slot 75, 76, 77 during forward rotation of the input shaft 19. Referring to FIG. 2, the shifter pawl 52 is completely engaged with the slot 75 and has moved downwardly such that its lug 56 has been received in one of the detent openings 55 of the ring gear 28. The remaining shifter pawls 53 and 54 have surfaces which engage and ride on the circumferential surface of the shifter shaft 59. This prevents the shifter pawls 53 and 54 from being completely engaged in either of the respective slots 76 and 77. Therefore, as shown in FIG. 2, the shifter pawls 53 and 54 are in their disengaged positions wherein the respective ring gears 29 and 30 are not arrested and are free to rotate relative to the housing 16.

In the present embodiment, biasing means which include spring retainers 79 and compression coil springs 80 are operatively connected to each of the shifter pawls 52, 53, 54. Each of the spring retainers 79 includes axially extending openings which rotatably receive the shifter shaft 59. The coil springs 80 urge the shifter pawls 52, 53, 54 radially inwardly toward their engaged positions. However, as noted above, an individual shifter pawl cannot move to its engaged position until it is aligned with its respective slot 75, 76, 77 defined by the shifter shaft 59. This is, as mentioned above, controlled manually by the gear shift control 65.

When the gear shift handle 66 is moved to another gear indication, the shifter lever 59 is rotated through a small arc by movement of the cable 64 and the lever arm 63. When this occurs, the shifter pawl which currently is in its engaged position is cammed upwardly by the surface of the shifter shaft 59 and the shifter pawl relating to the selected gear ratio is biased downwardly by the respective coil spring 80 to its engaged position as soon as it is aligned with its respective slot 75, 76, 77.

Figure 3:
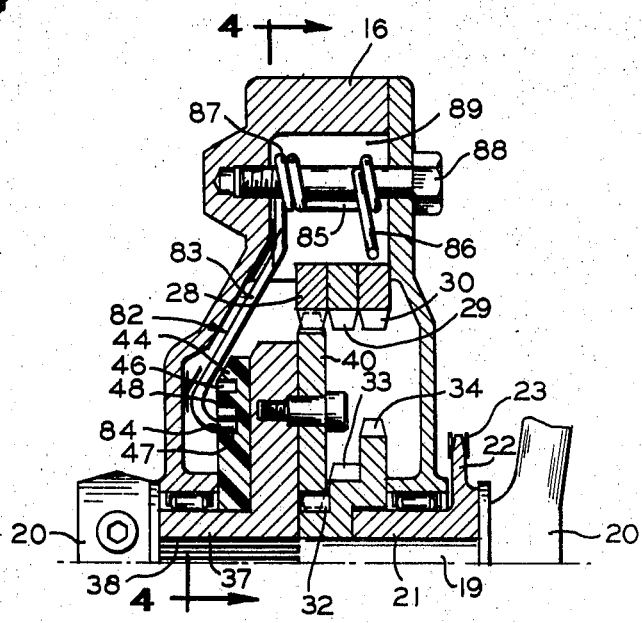
FIG. 3 is a fragmentary, cross-sectional view, taken along the line 3—3 of FIG. 1 and showing in particular cam means, according to the present invention.
Figure 9:
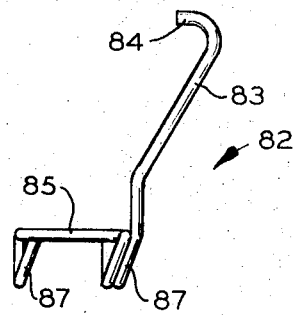
FIG. 9 is a side elevational view of a cam follower, which is a portion of cam means in accordance with the present invention.
Figure 10:
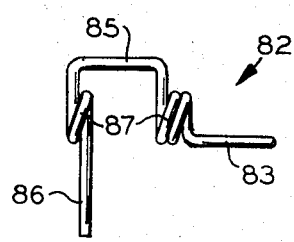
FIG. 10 is an elevational view of the cam follower taken at right angles to the view shown in FIG. 9.

The present transmission 15 is provided with a follower 82 which is a part of cam means which includes the cam plate 44 described above. Referring to FIGS. 9 and 10, the follower 82, according to the present embodiment, includes a follower arm 83 having a follower end 84 which cooperates with the outer and inner cam paths 46 and 47 defined by the cam plate 44 (See FIGS. 3-5). The follower 82 also includes a cross bar 85 and a pawl end 86. Aligned coils 87 receive a bolt 88 which pivotally mounts the follower 82 in a housing recess 89, as shown in FIG. 3.

During forward rotation of the input shaft 19, as shown in FIG. 4, the follower end 84 mates with the inner cam path 47 of the cam plate 44. One of the shifting pawls, in this instance the shifter pawl 54, is engaged with the ring gear 30 and the transmission is in its underdrive speed ratio.

Referring to FIG. 5, upon reverse rotation of the input shaft 19, the guide fingers 48 of the cam plate 44 engage the follower end 84 urging it to move radially outwardly until it is cooperating with the outer cam path 46 of the cam plate 44. When this occurs, the entire follower 82 is pivoted. The cross bar 85 mates with recesses 91 defined in the sides of the shifter pawls 52, 53, 54 and urges them outwardly. This positive mechanical action insures that all of the shifter pawls 52, 53, 54 are in their radially outwardly or disengaged positions. At the same time, the pawl end 86 is moved downwardly so that it mates with one of the detent openings 55 in the underdrive ring gear 30. This insures that during braking action, the best mechanical advantage is achieved. It also insures that when a transmission having a neutral position (not shown) a utilized, that the transmission is not free wheeling during any braking action.

Upon renewed forward rotation of the input shaft 19, the above action is reversed. The follower end 84 is guided from the outer cam path 46 by the guide members 48 radially inwardly until it cooperates with the inner cam path 47. Simultaneously, the cross bar 85 is pivoted downwardly and the shifter pawl 52, 53, 54 which corresponds to the speed selected by use of the gear shift control 65 is free to be urged downwardly by its spring 80 into the engaged position. Simultaneously, the pawl end 86 is pivoted upwardly out of the detent opening 55 of the ring gear 30.

In the present embodiment the cam plate 44 and its follower 82 serve as automatically actuated means for selecting a predetermined one of said power paths and conditioning the transmission 15 for reverse driving between the input shaft 19 and the output shaft 21.

The cam plate 44 and its follower 82 fall within the broader classification of clutch means and other types of clutch means or cam means may be utilized as automatically actuated means, according to the present invention, as defined by the appended claims.

It has been found that the present transmission provides great flexibility and also insures that proper braking action is achieved.

What I claim is:

1. A transmission comprising, in combination:
   a. input and output means for such transmission with said input means being adapted for rotation in both a forward and a reverse direction for driving said output means in a forward and reverse direction, respectively,
   b. at least two selectable power paths for drivingly connecting said input and said output means,
   c. control means for selecting the desired one of said power paths and
   d. cam means responsive to reverse rotation of said input means for selecting a predetermined one of said power paths and for maintaining said power path during continued reverse rotation.

2. A transmission, according to claim 1, including a housing and wherein
   a. said input means comprises a shaft rotatably mounted in and projecting from said housing and said output means comprises a drive member rotatably mounted relative to said shaft,
   b. said power paths comprising at least two gear train disposed in said housing,
   c. said control means including arrest means removably connected to each of said gear train, wherein a respective one of said gear train is selectively engaged in a driving relationship between said input shaft and said drive member while the remaining ones of said gear train are in a non-drive relationship and
   d. said cam means comprising a cam mounted on said input shaft and a follower having a pawl end adjacent said gear train whereby upon reverse rotation of said input shaft said pawl end engages a predetermined one of said gear train.

3. A transmission, according to claim 2, wherein said follower includes means adjacent said arrest means for disengaging said arrest means from said gear train upon reverse rotation of said input shaft.

4. A transmission, according to claim 2, wherein each of said power paths comprise a gear set disposed in said housing, each of said gear sets including a ring gear, a sun gear and planetary gearing disposed between said sun gear and said ring gear, said planetary gearing being drivingly connected to said shaft and said sun gear being drivingly connected to said drive member.

5. A transmission, according to claim 4, wherein each of said ring gears includes detent means and said arrest means includes a separate shifter pawl associated with each of said ring gears, each of said shifter pawls being movable between a disengaged position wherein it is spaced from its associated ring gear and an engaged position wherein it is received by such detent means of its associated ring gear.

6. A transmission, according to claim 5, wherein said disengaging means of said follower comprises a cross bar which upon reverse rotation of said shaft engages any shifter pawl which is in an engaged position and moves it to a disengaged position.

7. A transmission, according to claim 5, wherein said detent means comprises a plurality of notches in the periphery of each of said ring gears.

8. A transmission, according to claim 2, wherein said cam comprises a circular plate having a pair of concentric inner and outer cam surfaces defined on one side of said cam plate and a plurality of circumferentially spaced and inclined guide members disposed between said inner and outer cam surfaces.

9. A transmission, according to claim 8, wherein said guide members are resilient adjacent said inner cam surface.

10. A transmission, according to claim 8, wherein said follower includes a follower end in cooperating relationship with said cam wherein upon forward rotation of said input shaft said end is disposed adjacent one of such cam surfaces and upon reverse rotation of said input shaft said end is disposed adjacent the other one of such cam surfaces.

11. A transmission, according to claim 10, wherein said inclined guide members guide said follower end between said concentric cam surfaces upon a rotary change of direction of said input shaft.

12. A velocipede transmission comprising, in combination,
  a. a housing,
  b. an input shaft mounted in and projecting from said housing and an output shaft rotatably mounted relative to said input shaft, said input shaft being adapted for driving said output shaft in a forward and reverse direction, respectively,
  c. a plurality of power paths for drivingly connecting said input shaft and said output shaft, each of said power paths comprising a gear set disposed in said housing, said gear set including a ring gear, a sun gear and planetary gearing disposed between said sun gear and said ring gear, said planetary gearing being drivingly connected to said input shaft and said sun gear being drivingly connected to said output shaft, said ring gear defining a plurality of detents adjacent its periphery,
  d. control means for selecting a desired one of said power paths, said control means including a separate shifter pawl associated with each of said ring gears, means for separately moving each of said shifter pawls between a disengaged position wherein it is spaced from its associated ring gear and an engaged position wherein it is received by one of said detents of its associated ring gear, whereby said ring gear is held stationary relative to said housing, and
  e. cam means including a cam plate mounted on said input shaft and a follower pivotally mounted by said housing, said cam plate defining on its side a pair of inner and outer concentric cam paths, a plurality of inclined guide members extending between said cam paths, said follower including a follower end in cooperating relationship with said cam plate, wherein upon forward rotation of said input shaft said end is disposed within such inner cam path and upon reverse rotation of said input shaft said end is disposed with such outer cam path, said inclined guide members guiding said follower end between such inner and outer cam paths, said follower also including an intermediate cross bar and a pawl end, said cross bar engaging said shifter pawls upon reverse rotation of said input shaft and holding said shifter pawls in the disengaged position during such reverse rotation, said pawl end engaging a predetermined one of said ring gears upon such reverse rotation, whereby such predetermined ring gear is held stationary relative to said housing.

13. A transmission, comprising, in combination:
  a. input and output means for such transmission with said input means being adapted by rotation in both a forward and a reverse direction for driving said output means in a forward and reverse direction, respectively,
  b. at least two selectable power paths for drivingly connecting said input and said output means,
  c. control means for selecting the desired one of said power paths to condition the same for drivingly connecting said input and said output shafts in a forward driving condition,
  d. automatically actuated means for selecting a predetermined one of said power paths and conditioning the transmission for reverse driving between said input and output means, and
  e. actuating means unitarily rotatable with said input means for actuating said automatic means upon reverse rotation of said input means.

14. A transmission, according to claim 13, wherein said automatically actuated means includes neutralizing means for disengaging such connection between said input and said output shafts upon actuation of said automatic means by said actuating means.

15. A transmission, according to claim 14, including a housing and wherein
  a. said input means comprises a shaft rotatably mounted in and projecting from said housing and said output means comprises a drive member rotatably mounted relative to said shaft,
  b. said power paths comprising at least two gear train disposed in said housing, c. said control means including arrest means removably connected to each of said gear train, wherein a respective one of said gear train is selectively engaged in a driving relationship between said input shaft and said drive member while the remaining ones of said gear train are in a non-drive relationship and d. said actuating means and said automatically actuated means comprise a cam mounted on said input shaft and a follower having a pawl end adjacent said gear train whereby upon reverse rotation of said input shaft said pawl end engages a predetermined one of said gear train.

16. A transmission, according to claim 15, wherein said neutralizing means comprises a cross bar on said follower.

17. A transmission, according to claim 15, wherein each of said power paths comprise a gear set disposed in said housing, each of said gear sets including a ring gear, a sun gear and planetary gearing disposed between said sun gear and said ring gear, said planetary gearing being drivingly connected to said shaft and said sun gear being drivingly connected to said drive member.

18. A transmission, according to claim 17, wherein each of said ring gears includes detent means and said control means includes a separate shifter pawl associated with each of said ring gears, each of said shifter pawls being movable between a disengaged position wherein it is spaced from its associated ring gear and an engaged position wherein it is received by such detent means of its associated ring gear.

19. A transmission, according to claim 18, wherein said detent means comprises a plurality of notches in the periphery of each of said ring gears.

20. A transmission, according to claim 15, wherein said cam comprises a circular plate having a pair of concentric inner and outer cam surfaces defined on one side of said cam plate and a plurality of circumferentially spaced and inclined guide members disposed between said inner and outer cam surfaces.

21. A transmission, according to claim 20, wherein said guide members are resilient adjacent said inner cam surface.

22. A transmission, according to claim 21, wherein said follower includes a follower end in cooperating relationship with said cam wherein upon forward rotation of said input shaft said end is disposed adjacent one of such cam surfaces and upon reverse rotation of said input shaft said end is disposed adjacent the other one of such cam surfaces.

23. A transmission, according to claim 22, wherein said inclined guide members guide said follower end between said concentric cam surfaces upon a rotary change of direction of said input shaft.

24. A transmission, comprising, in combination:

a. input and output means for such transmission with said input means being adapted by rotation in both a forward and a reverse direction for driving said output means in a forward and reverse direction, respectively, b. at least two selectable power paths for drivingly connecting said input and said output means, c. a shiftable element for each of said power paths, with each of said elements having a neutral position and a connected position, d. said shiftable elements in their neutral position disengaging the power path associated therewith from a driving condition, and when in its connecting position, connecting the power path associated therewith between said input and output means, e. manually operable control means for moving said shiftable elements between their positions, f. automatically actuated means for selecting a predetermined one of said power paths to condition the transmission for reverse driving between said input and said output means and simultaneously overriding said control means and moving said shiftable elements to their neutral position, and g. means responsive to reverse rotation of said input means for actuating said automatic means upon reverse rotation of said input means.

25. A transmission, comprising, in combination:

a. input and output means for such transmission with said input means being adapted by rotation in both a forward and a reverse direction for driving said output means in a forward and reverse direction, respectively, b. at least two selectable power paths for drivingly connecting said input and said output means, c. control means for selecting the desired one of said power paths to condition the same for drivingly connecting said input and said output shafts in a forward driving condition, d. said power paths each including at least a pair of rotatable gears, and e. means independent of the rotation of said gears and actuable upon reverse rotation of said input shaft for overriding the selection of said control means and for selecting a predetermined one of said power paths for conditioning the transmission for reverse driving between said input and output means.

* * * * *